US010956940B2

(12) United States Patent
Rahman et al.

(10) Patent No.: US 10,956,940 B2
(45) Date of Patent: Mar. 23, 2021

(54) PROVISION OF RELEVANT OFFERS BASED ON GPS DATA

(71) Applicant: FAIR ISAAC CORPORATION, Roseville, MN (US)

(72) Inventors: Shafi Rahman, Roseville, MN (US); Amit Kiran Sowani, Roseville, MN (US); Rakhi Agrawal, Roseville, MN (US); Manmeet Kaur, Roseville, MN (US)

(73) Assignee: FAIR ISAAC CORPORATION, Roseville, MN (US)

( * ) Notice: Subject to any disclaimer, the term of this patent is extended or adjusted under 35 U.S.C. 154(b) by 706 days.

(21) Appl. No.: 13/901,467

(22) Filed: May 23, 2013

(65) Prior Publication Data

US 2014/0351044 A1 Nov. 27, 2014

(51) Int. Cl.
*G06Q 30/02* (2012.01)
(52) U.S. Cl.
CPC ..... *G06Q 30/0261* (2013.01); *G06Q 30/0255* (2013.01); *G06Q 30/0251* (2013.01); *G06Q 30/0269* (2013.01)
(58) Field of Classification Search
None
See application file for complete search history.

(56) References Cited

U.S. PATENT DOCUMENTS

| 7,398,154 | B2 * | 7/2008 | Phuyal | G06T 17/05 340/995.1 |
| 8,417,715 | B1 * | 4/2013 | Bruckhaus | G06Q 30/0202 707/758 |
| 10,068,251 | B1 * | 9/2018 | Scofield | G06Q 30/0255 |
| 2008/0242349 | A1 * | 10/2008 | Rofougaran | 455/556.1 |
| 2009/0234710 | A1 * | 9/2009 | Belgaied Hassine | G06Q 30/02 705/7.29 |

(Continued)

OTHER PUBLICATIONS

Elsevier, "Combining empirical experimentation and modeling techniques: A design research approach for personalized mobile advertising applications" (Published: https://www.sciencedirect.com/science/article/pii/S0167923607001765 Oct. 13, 2007) (Year: 2007).*

*Primary Examiner* — Chrystina E Zelaskiewicz
*Assistant Examiner* — Alfred H Tsui
(74) *Attorney, Agent, or Firm* — Mintz Levin Cohn Ferris Glovsky and Popeo, P.C.

(57) ABSTRACT

The current subject matter relates to generation of relevant real-time offers based on global positioning system (GPS) data of an individual. A mobile device of an individual can record the GPS data of the individual. The mobile device can be connected to a central system. The central system can receive the recorded GPS data. The central system can predict, by using a trained predictive model and based on transaction history of the individual and the GPS data, categories of likely purchases by the individual. The central system can generate or reproduce offers from merchants of the predicted categories that are located within a threshold distance from a current location of the individual. The central system can send the generated offers to the mobile device that can display the generated offers in real-time. Other applications can include improving relevance of batch offers and/or real-time offers based on a recent purchase trigger.

20 Claims, 6 Drawing Sheets

(56) References Cited

U.S. PATENT DOCUMENTS

| | | | |
|---|---|---|---|
| 2010/0318292 A1* | 12/2010 | Kulik | G01S 19/49 |
| | | | 701/414 |
| 2011/0099046 A1* | 4/2011 | Weiss | G06Q 30/0205 |
| | | | 705/7.31 |
| 2011/0270517 A1* | 11/2011 | Benedetti | G01C 21/3697 |
| | | | 701/533 |
| 2012/0066064 A1* | 3/2012 | Yoder et al. | 705/14.53 |
| 2012/0158474 A1* | 6/2012 | Fahner | G06O 30/0211 |
| | | | 705/14.13 |
| 2012/0163206 A1* | 6/2012 | Leung | G01S 5/0009 |
| | | | 370/252 |

* cited by examiner

| Customer | Latitude | Longitude | Time | Accuracy | POI | Site Distance |
|---|---|---|---|---|---|---|
| 1234 | 12.983° N | 77.583° E | 05/01/2013 14:23:35 | 5m | Barista, Leela, Amoeba | 40m, 30m, 50m |

PROVISION OF RELEVANT OFFERS BASED ON GPS DATA

TECHNICAL FIELD

The subject matter described herein relates to generation of relevant real-time offers based on global positioning system (GPS) data.

BACKGROUND

Individuals usually have personal preferences for purchasing different products. The individuals often visit known similar stores to purchase their preferred products. Merchants desire to capture an insight into a future propensity of an event in relation to the individual. Based on this insight, the merchants can drive personalized recommendations to individuals to improve their sales revenue. Conventionally, these personalized recommendations may not be relevant, as the recommendations may characterize offers from merchants located in places distant from the individual. Thus, the relevance of these personalized recommendations can be further improved by using historical as well as real-time global positioning system (GPS) location of the individual.

SUMMARY

The current subject matter describes generation of relevant real-time offers based on global positioning system (GPS) data of an individual. A mobile device of an individual can record the GPS data of the individual. The mobile device can be connected to a central system via a communication network. The central system can receive the recorded GPS data. The central system can predict, by using a trained predictive model and based on transaction history of the individual and the GPS data, categories of likely purchases by the individual. The central system can then generate or reproduce offers from merchants of the predicted categories that are located within a threshold distance from a current location of the individual. The central system can send the generated offers to the mobile device that can display the generated offers in real-time. In some implementations, the subject matter described herein can advantageously improve relevance of at least one of batch offers and real time offers based on a recent purchase trigger. Related methods, apparatuses, systems, techniques and articles are also described.

In one aspect, a central system can receive, from a mobile device of an individual, global positioning system data of the individual recorded by the mobile device. The central system can include one or more servers connected to the mobile device of the individual via a communication network. The central system can use a trained predictive model to predict categories of likely purchases by the individual based on transaction history of the individual and the global positioning system data. The central system can generate offers from merchants of the predicted categories that can be located within a threshold distance from a location of the individual. The generated offers can be sent by the central system to the mobile device that can display the generated offers in real-time.

In some variations, one or more of the following can be implemented individually or in any feasible combination. The communication network can be internet or a cellular network. The global positioning system data can include: an identifier used to uniquely identify the individual, the location comprising a latitude and a longitude of the individual, a time stamp characterizing a time of recording the global positioning system data, an accuracy of the recorded global positioning system data, one or more places of interest associated with the global positioning system locations (for example, locations where the individual frequently purchases one or more products and is likely to purchase some products in future), and one or more distances of the corresponding one or more places of interest from the locations of the individual.

Further, the central system can cleanse the received global positioning system data to remove a high variability in frequency and spread of recorded location points in the recorded global positioning system data. The cleansing of the global positioning system data can include averaging global positioning system data recorded over a long duration of time so as to obviate an impact of motion vectors associated with global positioning data over a short period of time. The cleansing of the global positioning system data can further include removing repeated global positioning system data and closely spaced global positioning system data to remove repetitive and redundant data. The cleansing of the global positioning system data can further include executing an outlier detection technique for removing a value in the global positioning system data that has a frequency below a threshold value to remove outlier values from the global positioning system data. The cleansing of the global positioning system data can further include removing points in the global positioning system data that characterize that at least one of velocity and distance covered by the individual is more than respective threshold values to remove infeasible data from the global positioning system data. The cleansing of the global positioning system data can further include removing, from the global positioning system data, data for which values of corresponding accuracy metric are below a corresponding threshold value.

Furthermore, the central system can compute global positioning data variables for the individual. The global positioning data variables can include: basic activity variables characterizing activity of the individual, anchor point variables characterizing locations where the individual spends most time within a day, path variables that characterizes an averaged routine path followed by the individual, and place of interest variables characterizing locations where the individual frequently purchases one or more products. The trained predictive model can predict the categories based on the global positioning data variables for the individual. The basic activity variables can include: total distance travelled by the individual, an hour of maximum activity of the individual, average distance travelled per day by the individual, weekend activity of the individual, velocity of travel by the individual, and an idle time of the individual. The place of interest variables can be computed using a text mining technique. The predictive model can be trained earlier in a design-time mode.

In the design-time mode, the predictive model is trained. In the design-time mode, the central system can obtain global positioning system data for a plurality of individuals. The central system can cleanse the global positioning system data of the plurality of individuals. The central system can compute global positioning system data variables for each individual of the plurality of individuals. The central system can obtain historical transaction data for each individual of the plurality of individuals. The central system can generate and train a predictive model based on the global positioning system data variables and the historical transaction data of each individual.

In another aspect, a mobile device is described. The mobile device can include at least one programmable processor, and a machine-readable medium that can store instructions that, when executed by the at least one processor, cause the at least one programmable processor to perform the following operations. The mobile device can record global positioning system data of an individual. The mobile device can send the global positioning system data to a central system that can include one or more servers via a communication network. The central system can execute a trained predictive model that can use the global positioning data of the individual to generate relevant offers from relevant merchants located within a threshold distance from a location of the individual, wherein the relevant merchants can selling at least one of products and services that the individual is likely to purchase. The mobile device can then receive the generated offers from the central system. The mobile device can then display the generated offers on a graphical user interface in real-time.

In yet another aspect, a central system comprising one or more servers can obtain global positioning system data for a plurality of individuals. The central system can compute global positioning system data variables for each individual of the plurality of individuals. The central system can obtain historical transaction data for each individual of the plurality of individuals. The central system can generate and train a predictive model based on the global positioning system data variables and the historical transaction data of each individual. The trained predictive model can be used in a run-time mode for generating real-time offers for an individual by relevant merchants that are located within a threshold distance from a location of the individual.

Computer program products are also described that comprise non-transitory computer readable media storing instructions, which when executed by at least one data processors of one or more computing systems, causes at least one data processor to perform operations herein. Similarly, computer systems are also described that may include one or more data processors and a memory coupled to the one or more data processors. The memory may temporarily or permanently store instructions that cause at least one processor to perform one or more of the operations described herein. In addition, methods can be implemented by one or more data processors either within a single computing system or distributed among two or more computing systems.

The subject matter described herein provides many advantages. For example, the central system described herein can determine preferred merchants close to a current location of an individual, and offers being provided by those merchants. The central system can send those offers to a mobile device of the individual. Such a provision of offers on the mobile device of the individual can save time and effort of the individual, thereby providing a relaxing and smooth shopping experience for the individual. Moreover, such a provision of offers can be beneficial for merchants, as their offers can be directed to individuals that prefer the products that they have on sale.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

Like reference symbols in the various drawings indicate like elements.

DETAILED DESCRIPTION

Figure 1:
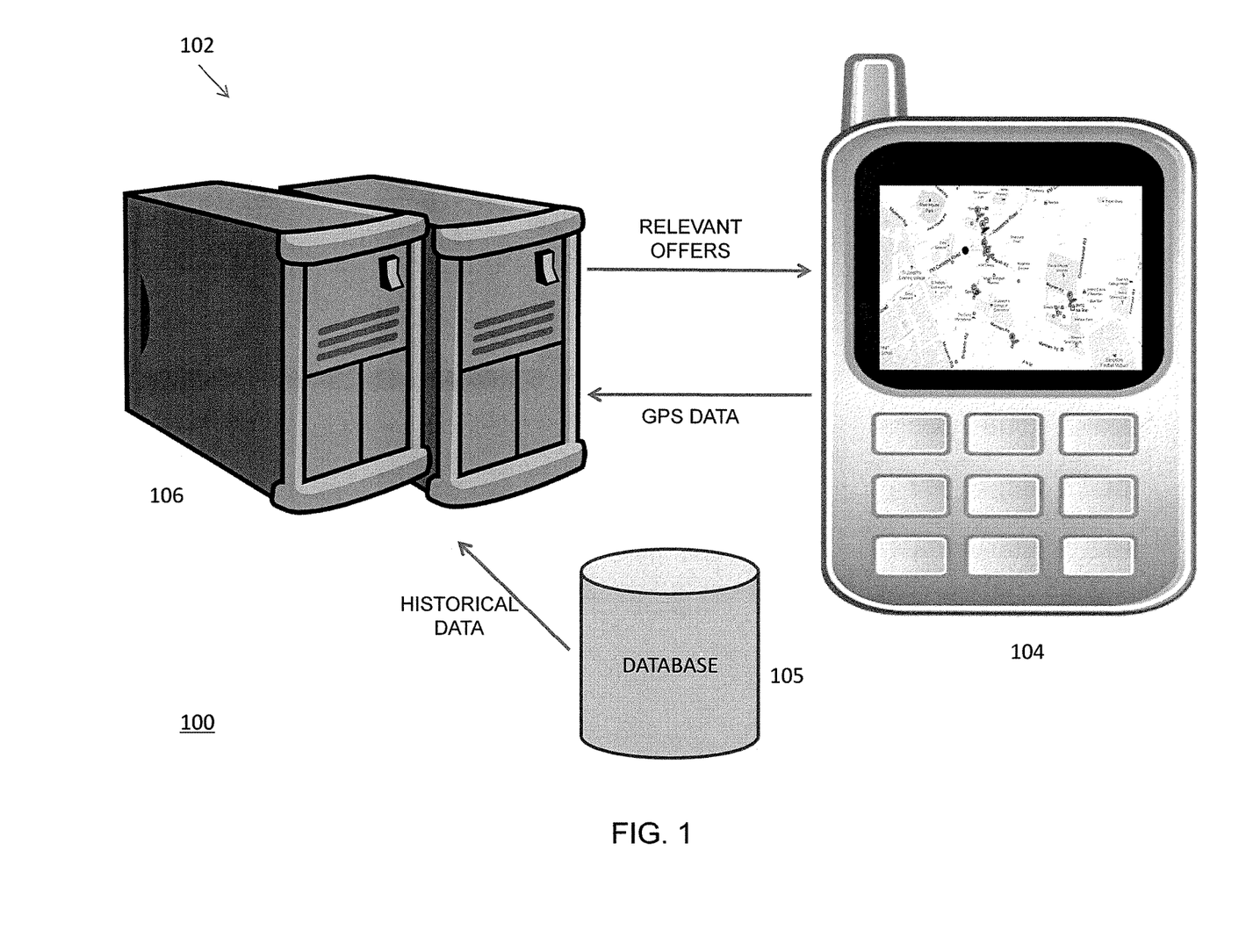
FIG. 1 is a system diagram illustrating a computing landscape for providing relevant real-time offers for an individual with a mobile device.

FIG. 1 is a system diagram 100 illustrating a computing landscape 102 for providing relevant real-time offers for an individual with a mobile device 104. The mobile device 104 can track global positioning system (GPS) data of the mobile device 104. The mobile device 104 can send the GPS data to a central system 106 via a communication network, such as internet, intranet, local area network, wide area network, metropolitan area network, infrared network, Bluetooth network, or any other network. The central system 106 can include one or more servers, and associated processing units and memory devices. The central system 106 can further obtain historical data associated with the individual from a database 105 containing historical transaction and GPS data. The central system 106 can use a predictive model, which has been generated and trained earlier in a design-time mode (described below), to generate relevant real-time offers for the individual. Relevant real-time offers are based on high scores generated by the predictive models. Relevant time-offers can include offers by merchants from which the individual has often purchased products, or where the individual has shown interest for purchase of products. The merchants can be identified based on visits of the individual, time spent by individual at one or more merchant locations and even averaged routine path, as captured by the GPS data.

Figure 2:
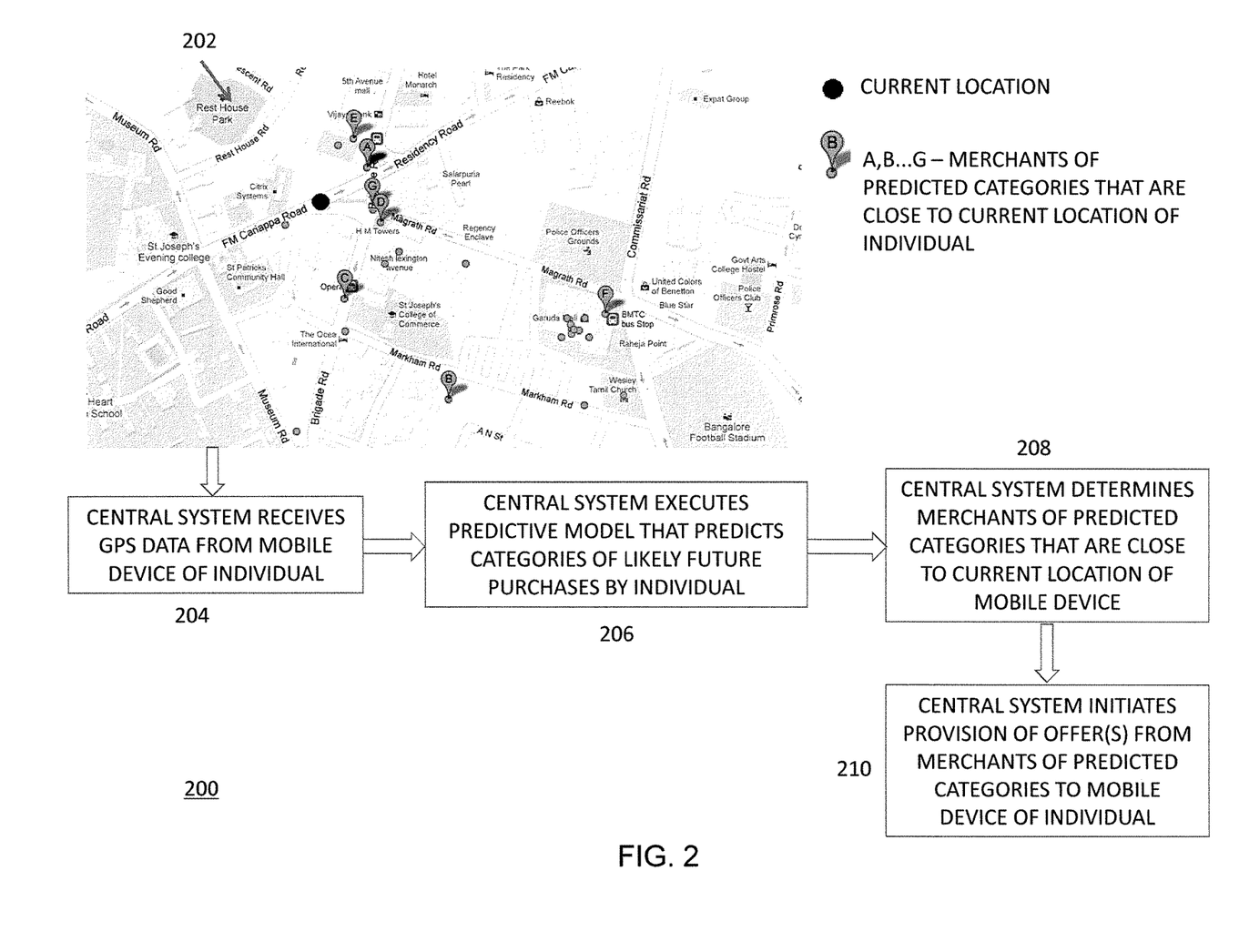
FIG. 2 is a flow-diagram illustrating a method for providing relevant real-time offers for an individual with a mobile device.

FIG. 2 is a flow-diagram 200 illustrating a method for providing relevant real-time offers for an individual with a mobile device 104. The mobile device 104 can execute a graphical user interface 202 that can optionally display GPS data. The displayed GPS data can include a map of current location and surrounding areas of the individual. The central system 106 can receive, at 204, GPS data from the mobile device 104. The central system 106 can execute, at 206, a predictive model that can predict categories of likely future purchases by the individual. The central system 106 can determine, at 208, merchants of predicted categories that are close to (that is, within a threshold distance, such as one hundred meters, five hundred meters, one mile, two miles, five miles, or any other distance) a current location of the mobile device 104. The central system 106 can send data associated with the determined merchants to the mobile device 104 so that the mobile device 104 can display these merchants (shown as A, B, C, D, E, F, and G) concurrently on the graphical user interface 202. The system can initiate, at 210, provision of one or more offers from the determined merchants. The provided offers can be either newly generated offers or preexisting offers by those determined merchants.

Figure 3:
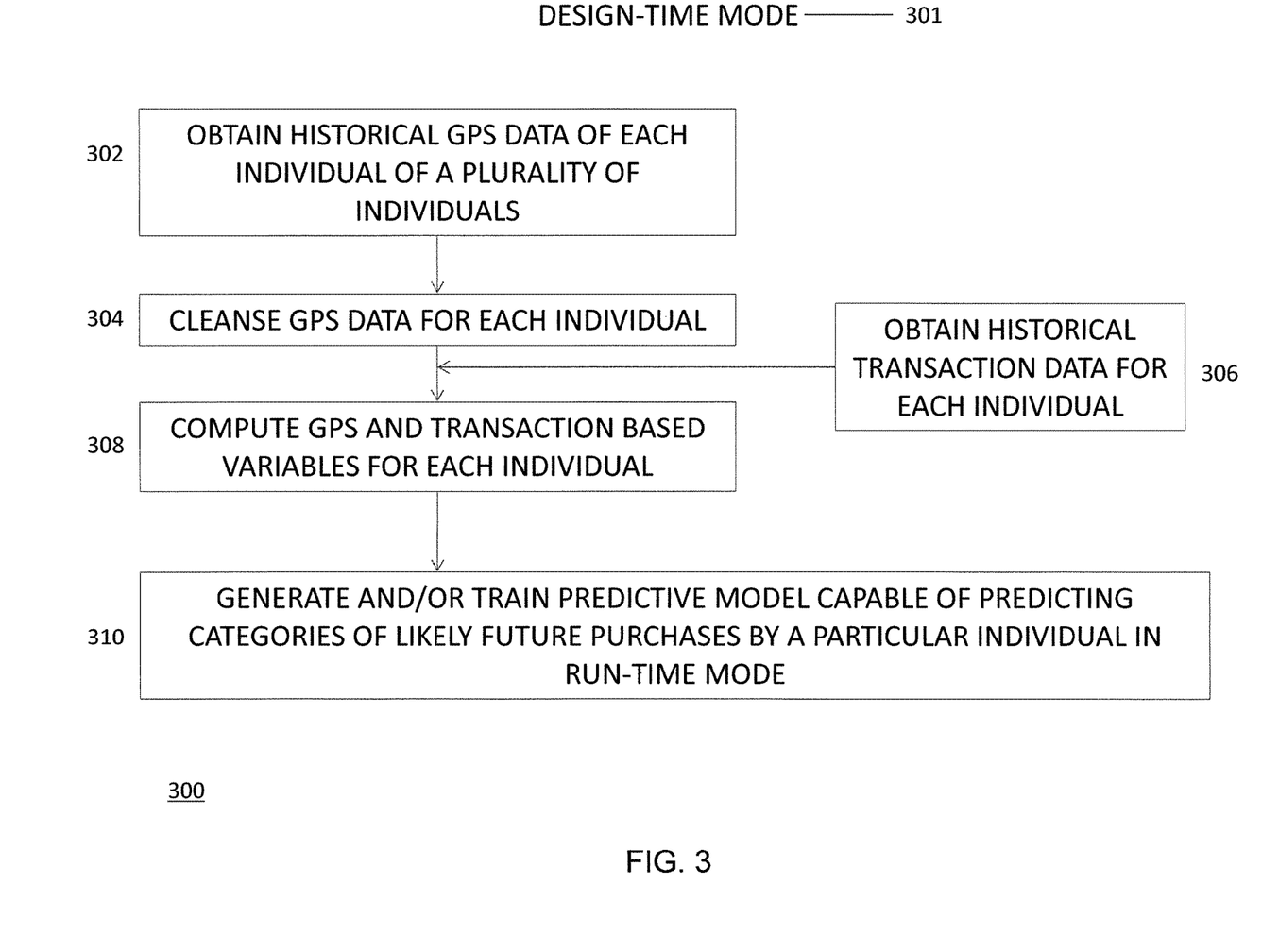
FIG. 3 is a flow-diagram illustrating a design-time mode for generating and/or training a predictive model capable of predicting categories of likely future purchases by a particular individual in run-time mode.

FIG. 3 is a flow-diagram 300 illustrating a design-time mode 301 for generating and/or training a predictive model capable of predicting categories of likely future purchases by a particular individual in run-time mode 401 (described below). The central system 106 can receive, at 302, historical GPS data from mobile devices of a plurality of individuals. The historical GPS data for each individual can include one or more of: a customer identifier, a current location (for example, longitude and latitude), a time stamp when the GPS data is recorded, an accuracy of recording, a nearby (that is, within a threshold distance) places of interest, and distances from the places of interest.

During the recording of the GPS data, a large number of recorded values can be missing. Further, there can be a high (for example, more than a threshold) variability in the frequency and spread of recorded location points in the recorded GPS data. Furthermore, some (for example, very small amount) of the recorded GPS data can be inaccurate and/or inconsistent. To overcome these potential problems with the recorded GPS data, the recorded GPS data needs to be cleansed to obtain useful information from the recorded GPS data. The central system 106 can cleanse, at 304, the GPS data for each individual. In design-time mode 301, the cleansing of the GPS data may or may not occur as the GPS data is collected. To cleanse the GPS data, the central system 106 can execute at least one of the following approaches in any feasible order.

Motion vectors can possibly cause inaccuracies in the GPS data if recorded over a short (for example, less than the threshold) period of time. To obviate such inaccuracies, the central system 106 can record and average the GPS data over a longer (for example, more than or equal to a threshold) duration in time by using a sliding window approach to reduce impact of motion vectors.

Further, the recorded GPS data can include closely spaced points that characterize the same information. Repeating of same information can cause roll-up computation problems. To prevent these roll-up computation problems, the central system 106 can remove the repeating or closely spaced points that are redundant.

Furthermore, the recorded GPS data can include outlier values (for example, location being recorded as Australia for an individual in the United States of America) of data that are incorrect. Because these outlier values are incorrect, these outlier values generally do not repeat over time. To remove these outlier values, the central system 106 can execute an outlier analysis approach that removes any value that has a frequency below a threshold.

Moreover, the recorded GPS data can include points that represent large velocities and distances covered by corresponding individuals. For example, these points may characterize velocities and distances that are not feasible (for example, more than a threshold) to be traversed by any individual. The central system 106 can determine such points, and then remove those points. For example, if the GPS data shows that a person travelled 10,000 miles in 1 hour, such data can be removed.

Further, the GPS data can include points representing inaccurate data, which can be inaccurate (for example, have an accuracy metric that is below a threshold) due to a limitation of tracking ability in mobile device tracking GPS data. The central system 106 can remove this inaccurate data.

The central system 106 can obtain, at 306, historical transaction data for each individual. In one implementation, to obtain historical transaction data, the central system 106 can collect transaction data from a mobile device of each individual over a period of time (for example, five days, ten days, one month, one year, or any other time period). In another implementation, to obtain historical transaction data, the central system 106 can collect historical transaction data of each individual from one or more financial institutions (for example, banks, lenders, and/or any other financial institution) associated with the individual.

The central system 106 can compute, at 308, GPS-based variables for each individual by using the cleansed GPS data for each individual and the historical transaction data for each individual. The GPS-based variables for each individual can include one or more of: basic activity variables, anchor point variables, path variables, and place of interest (POI) variables.

The basic activity variables can include one or more of: total distance travelled by the individual, the hour of maximum activity of the individual, average distance travelled per day by the individual, weekend activity of the individual, velocity of travel by the individual, and an idle time of the individual. These basic activity variables can be calculated as noted below. The central system 106 can measure the total distance travelled as a sum of distance between consecutive GPS points when each distance between two consecutive GPS points is more than a threshold. The central system 106 can calculate the hour of maximum activity as an hour of the day when the individual has maximum activity (that is, travels the most distance). The central system 106 can compute the average distance travelled per day as a ratio of a total distance travelled to a time (for example, days) within which the total distance is travelled. The central system 106 can calculate weekend activity as a ratio of distance travelled during a weekend to distance travelled during the week. The central system 106 can compute velocity of travel as a ratio of the total distance travelled to the time required for travelling the total distance. The central system 106 can calculate the idle time as total time minus travel time.

Figure 6:
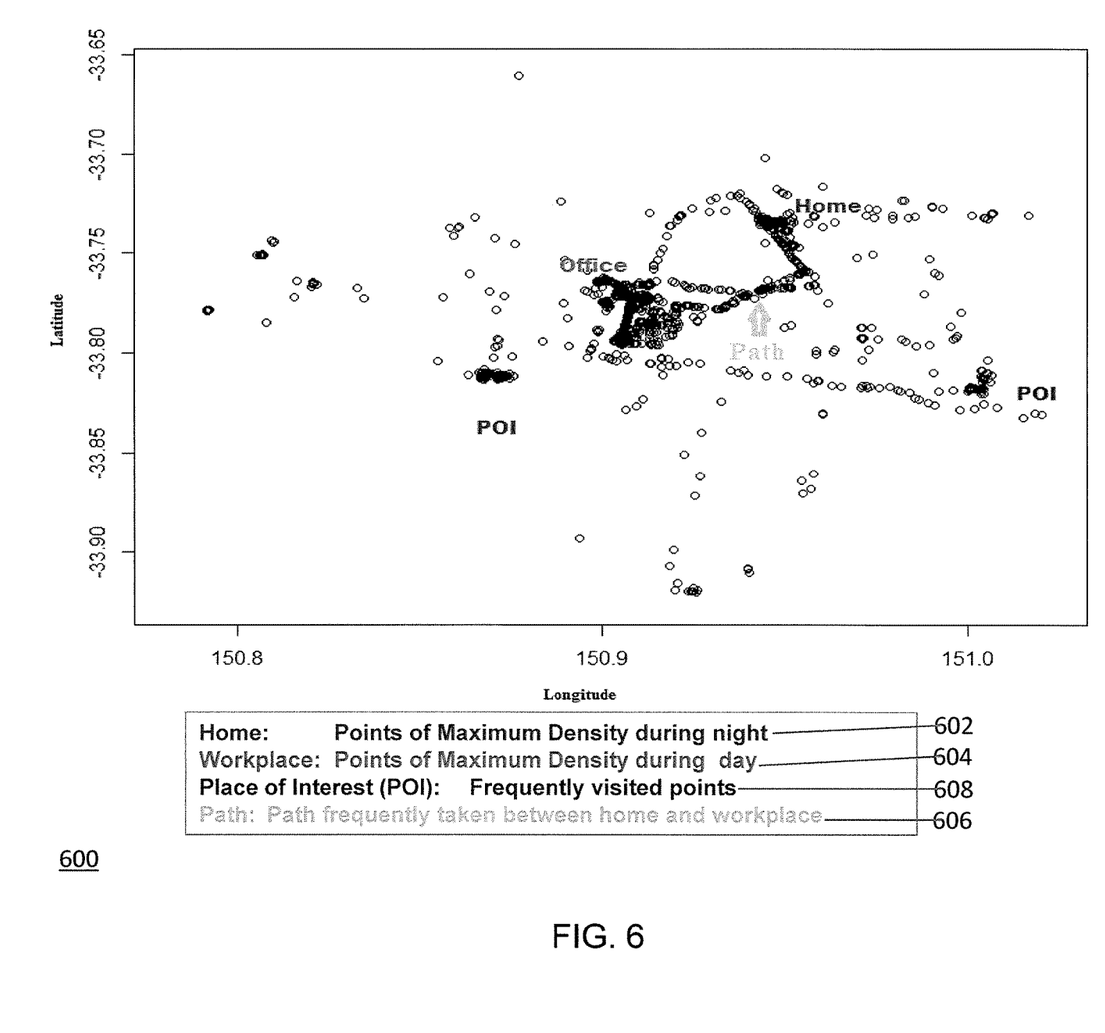
FIG. 6 is a diagram illustrating a display of computed anchor point variables, path variables, and place of interest (POI) variables on a graphical user interface of a central system.

The anchor point variables can characterize corresponding locations/places where each individual spends a lot of time (for example, more than a threshold amount of time, such as one hour, two hours, eight hours, twelve hours, or any other suitable value of time) during a day. These anchor point variables can characterize locations for one or more of home, office, and/or school for each individual based on the time of the day during which the GPS point density (for example, as shown in diagram 600 noted below) is highest. The basic activity variables that are related to movement of the individual can use the anchor point variables as a reference point.

The path variables can characterize a corresponding path of each individual between anchor points associated with the individual with places of interest (POI) that lie along the path or near (for example, within a threshold distance) the anchor points.

The place of interest (POI) variables can characterize locations where the individual is determined to frequently visit and/or purchase one or more products or services, and is likely to visit and/or purchase some products or services in the future, especially if given an offer. The central system 106 can generate the place of interest (POI) variables by using text mining techniques. Based on a pattern of the historical transaction data and the GPS data, places of interests amongst all locations can be determined that characterize corresponding most relevant locations of the individual. The place of interest (POI) variables can be computed based on frequency of visit of certain places of interest.

Based on the GPS-derived variables computed at 308, the central system 106 can generate and/or train, at 310, a predictive model capable of predicting categories of likely future purchases by a particular individual in run-time mode. The predictive model can be a scorecard model. Although a scorecard model is described, other predictive models can also be used, such as one or more of: a discrete choice model, a discriminant analysis model, a log-linear model, a neural network, a pattern recognition model, a regression model, a support vector machine, a survival analysis and tree model, and any other suitable predictive model.

Figure 4:
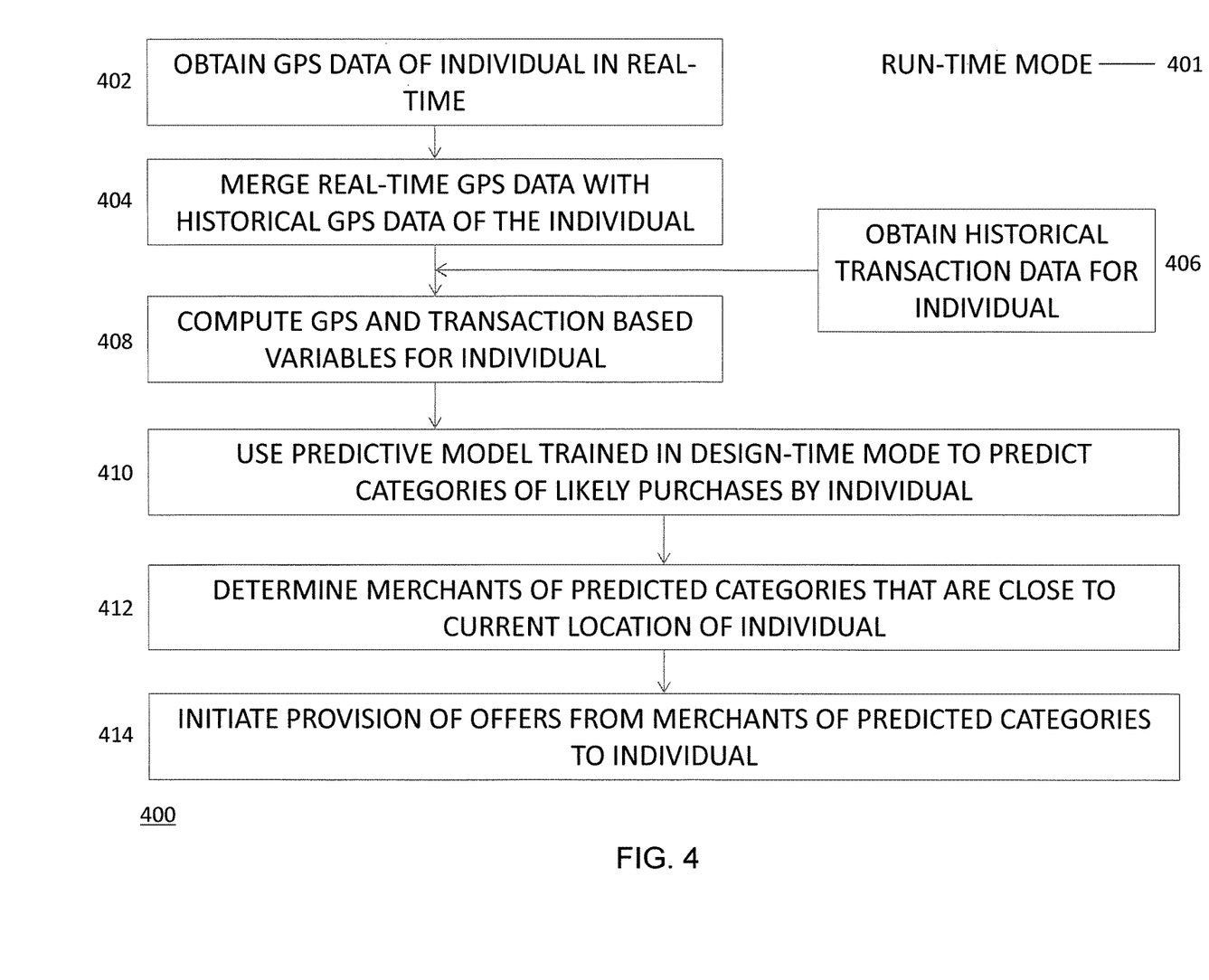
FIG. 4 is a flow-diagram illustrating a run-time mode for using a predictive model trained in design-time mode to provide relevant real-time offers to an individual with a mobile device.

FIG. 4 is a flow-diagram 400 illustrating a run-time 401 mode for using a predictive model trained in design-time mode 301 (described above) to provide relevant real-time offers to an individual with a mobile device 104. The flow-diagram 400 describes aspects of the diagram 200 in further detail. The central system 106 can receive, at 402, real-time GPS data of a current individual in real-time. The GPS data for the current individual can include one or more of: a customer identifier, a current location (for example, longitude and latitude), a time stamp when the GPS data is recorded, an accuracy of recording, a nearby (that is, within a threshold distance) place of interest, and distance from the place of interest.

The central system 106 can merge, at 404 and in real-time, the real-time GPS data of the individual with the historical GPS data of the individual to obtain combined GPS data. In some implementations, the central system 106 can also cleanse the GPS data of the current individual in real-time (that is, when the central system 106 receives the GPS data from the mobile device 104). The cleansing can be performed using techniques noted above with respect to design-time mode 301, including as one or more of: recording and averaging over long duration in time, removal of repeated redundant data, sliding window frequency approach to remove outlier values, removal of data associated with large infeasible velocities and infeasible distances, removal of data associated with one or more low accuracy metrics.

The central system 106 can obtain, at 406, historical transaction data for the current individual. In one implementation, to obtain historical transaction data, the central system 106 can collect transaction data from the mobile device 104 over a period of time (for example, five days, ten days, one month, one year, or any other time period). In another implementation, to obtain historical transaction data, the central system 106 can collect historical transaction data from one or more financial institutions (for example, banks, lenders, and/or any other financial institution) associated with the individual. The central system 106 can obtain the historical data such that the historical data is available in real-time.

The central system 106 can compute, at 408 and based on the merged GPS data and the historical transaction data, GPS-based variables for the current individual in real-time. These GPS-based variables can include one or more of: basic activity variables, anchor point variables, path variables, and place of interest (POI) variables. These GPS-based variables for the current individual can be computed as discussed above with respect to design-time mode 301.

The central system 106 can use, at 410, the predictive model generated and/or trained at 310 in design-time mode 301 to predict categories of likely purchases by the current individual. In one example, the categories can be at least some of: fast food joints, coffee places, bars or taverns, tennis warehouse, golf store, travel agent, and any other suitable categories.

The central system 106 can determine, at 412 and in real-time, merchants of the predicted categories that are close (for example, within a threshold distance, such as fifty meters, hundred meters, five hundred meters, two miles, five miles, twenty miles, or any other value of distance) to the current location of the individual. For example, if one of the predicted categories is coffee places, the system 107 can determine coffee places, such as Starbucks, Peets Coffee, and The Coffee Bean & Tea Leaf, which are close to the location of the current individual.

The central system 106 can initiate, at 414 and in real-time, a provision of offers from the merchants determined at 412 to the mobile device 104 of the current individual. The central system 106 can then provide the offers to the mobile device 104, and the mobile device 104 can display those offers in real-time. Thus, the current individual advantageously has access to relevant offers in real-time.

Figure 5:
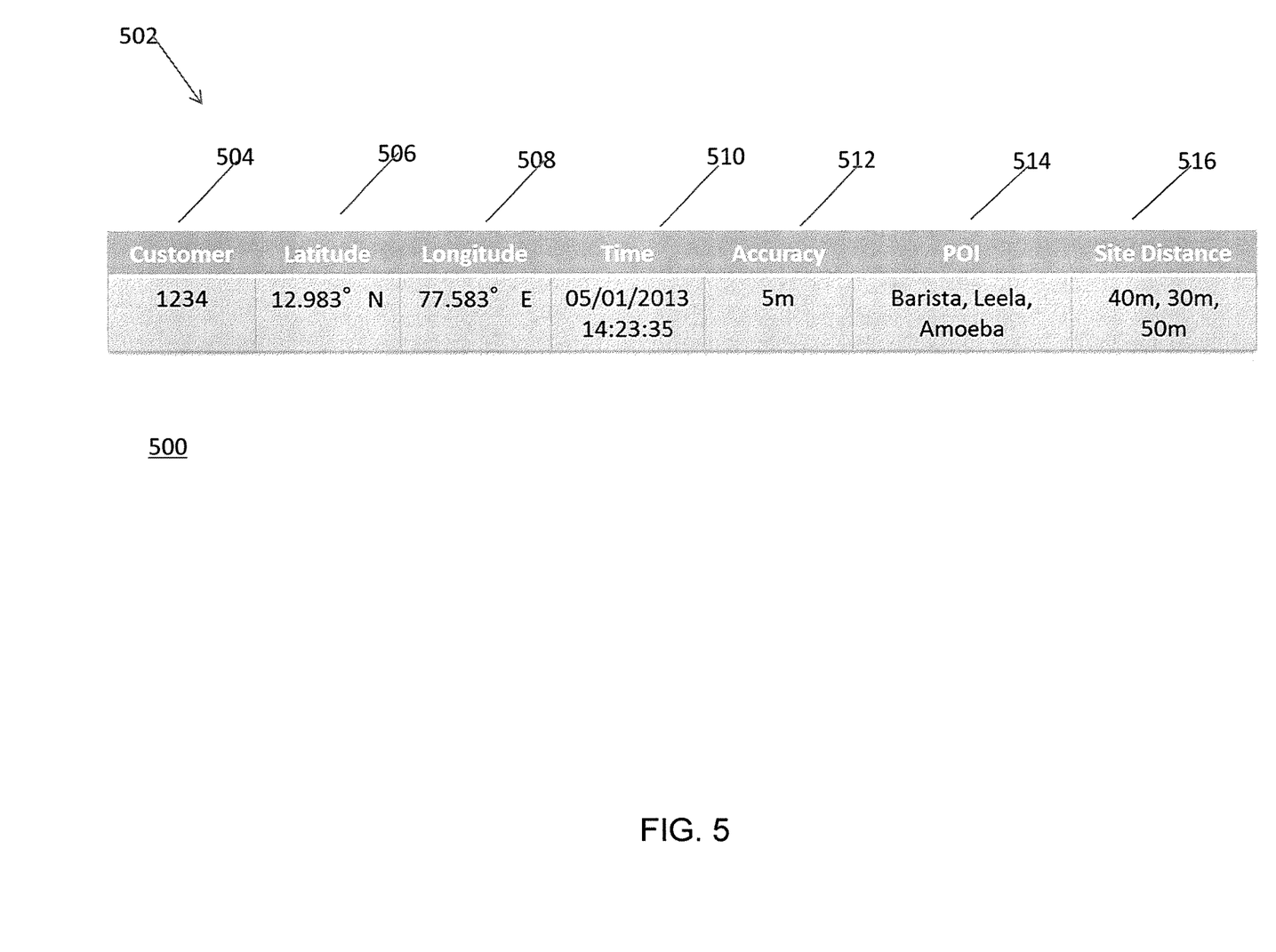
FIG. 5 is a diagram illustrating an example of global positioning system (GPS) data monitored by a mobile device of an individual.

FIG. 5 is a diagram 500 illustrating an example of GPS data 502 monitored by a mobile device 104 of an individual. The mobile device 104 can then send the GPS data 502 to the central system 106, which can then use this GPS data 502 to generate relevant offers for the individual. The GPS data 502 can include an identifier 504 of the individual (also referred to as customer), a latitude 506 and longitude 508 of the individual, a time stamp 510 characterizing a time of recording the GPS data 502, an accuracy 512 of capture of GPS data 502, a place of interest (POI) 514 where the individual frequently visits and/or purchases one or more products or services, and is likely to visit and/or purchase some products or services, and distance 516 of the place of interest (POI) 514 from the current location of the individual. The accuracy 512 of five meters can characterize that the individual is within a five-meter radius of the captured GPS location of the individual.

FIG. 6 is a diagram 600 illustrating a display of computed anchor point variables (for example, home 602 and workplace 604), path variables 606, and place of interest (POI) variables 608 on a graphical user interface of the central system 106.

The anchor point variables (602, 604) can characterize corresponding locations/places where each individual spends a lot (for example, more than a threshold amount of time, such as one hour, two hours, eight hours, twelve hours, or any other suitable value of time) of time. The basic activity variables that are related to movement of the individual can use the anchor point variables as a reference point.

The path variables 606 can characterize a corresponding path of each individual between anchor points associated with the individual. Places of interest (POI) can lie along the path or near (for example, within a threshold distance) the anchor points.

The place of interest (POI) variables 608 can characterize locations where the individual frequently visits and/or purchases one or more products or services, and is likely to visit and/or purchase some products or services in the future, especially if given an offer. The central system 106 can generate the place of interest (POI) variables from historical transaction data of the individual by using text mining techniques. The central system 106 can compute place of interest (POI) variables based on frequency of visit of certain places of interest by the individual.

Various implementations of the subject matter described herein can be realized/implemented in digital electronic circuitry, integrated circuitry, specially designed application specific integrated circuits (ASICs), computer hardware, firmware, software, and/or combinations thereof. These various implementations can be implemented in one or more computer programs. These computer programs can be executable and/or interpreted on a programmable system. The programmable system can include at least one programmable processor, which can be have a special purpose or a general purpose. The at least one programmable processor can be coupled to a storage system, at least one input device, and at least one output device. The at least one programmable processor can receive data and instructions from, and can transmit data and instructions to, the storage system, the at least one input device, and the at least one output device.

These computer programs (also known as programs, software, software applications or code) can include machine instructions for a programmable processor, and can be implemented in a high-level procedural and/or object-oriented programming language, and/or in assembly/machine language. As can be used herein, the term "machine-readable medium" can refer to any computer program product, apparatus and/or device (for example, magnetic discs, optical disks, memory, programmable logic devices (PLDs)) used to provide machine instructions and/or data to a programmable processor, including a machine-readable medium that can receive machine instructions as a machine-readable signal. The term "machine-readable signal" can refer to any signal used to provide machine instructions and/or data to a programmable processor.

To provide for interaction with a user, the subject matter described herein can be implemented on a computer that can display data to one or more users on a display device, such as a cathode ray tube (CRT) device, a liquid crystal display (LCD) monitor, a light emitting diode (LED) monitor, or any other display device. The computer can receive data from the one or more users via a keyboard, a mouse, a trackball, a joystick, or any other input device. To provide for interaction with the user, other devices can also be provided, such as devices operating based on user feedback, which can include sensory feedback, such as visual feedback, auditory feedback, tactile feedback, and any other feedback. The input from the user can be received in any form, such as acoustic input, speech input, tactile input, or any other input.

The subject matter described herein can be implemented in a computing system that can include at least one of a back-end component, a middleware component, a front-end component, and one or more combinations thereof. The back-end component can be a data server. The middleware component can be an application server. The front-end component can be a client computer having a graphical user interface or a web browser, through which a user can interact with an implementation of the subject matter described herein. The components of the system can be interconnected by any form or medium of digital data communication, such as a communication network. Examples of communication networks can include a local area network, a wide area network, internet, intranet, Bluetooth network, infrared network, or other networks.

Although a few variations have been described in detail above, other modifications can be possible. For example, the logic flows depicted in the accompanying figures and described herein do not require the particular order shown, or sequential order, to achieve desirable results. Other embodiments may be within the scope of the following claims.

What is claimed is:
1. A method comprising:
receiving, at a central system comprising one or more servers connected to a mobile device of an individual via a communication network, global positioning system data of the individual recorded by the mobile device, the global positioning system data of the individual being recorded for at least a threshold duration of time, the global positioning system data comprising a time stamp characterizing a time of recording the global positioning system data, a place of interest where the individual frequently purchases one or more products and is likely to purchase some products in future, and a distance of the place of interest from a location of the individual;
merging, by the central system and in real-time, the received global positioning system data with historical global positioning system data of the individual to obtain a combined global positioning system data, the historical global positioning system data obtained from the mobile device over a period of time;
obtaining, in response to the merging, historical transaction data of the individual, the historical transaction data collected from one or more financial institutions associated with individual;
cleansing, by the central system and in real-time, the received global positioning system data to remove a high variability in a frequency and a spread of recorded location points in the recorded global positioning system data, the removal of the high variability in the frequency and the spread of recorded location points comprising removing repeated global positioning system data and closely spaced global positioning system data to remove repetitive and redundant data, the cleansing comprising averaging the global positioning system data by using a sliding window approach, the averaging obviating an impact of motion vectors associated with the global positioning system data, the cleansing of the global positioning system data further comprising removing at least one outlier value in the global positioning system data that has a frequency below a threshold frequency value;
computing, by the central system and based on the combined global positioning system data and the historical transaction data, global positioning data variables for the individual, the global positioning data variables including: basic activity variables characterizing activity of the individual, anchor point variables characterizing locations where the individual spends most time within a day, path variables that characterizes an averaged routine path followed by the individual, and place of interest variables characterizing locations where the individual frequently purchases one or more products;
predicting, by the central system by using a trained predictive model and based on the historical transaction data of the individual, the global positioning data variables and the global positioning system data, categories of likely purchases by the individual, the trained predictive model being a scorecard model; and
generating, by the central system, offers from merchants of the predicted categories that are located within a threshold distance from the location of the individual, the generated offers being sent by the central system to the mobile device that displays the generated offers in real-time.

2. The method of claim 1, wherein:
the communication network is internet; and
the categories comprise one or more of: fast food joints, coffee places, bars or taverns, tennis warehouse, golf store, and travel agent.

3. The method of claim 1, wherein the global positioning system data further comprises: an identifier used to uniquely identify the individual, the location comprising a latitude and a longitude of the individual, and an accuracy of the recorded global positioning system data.

4. The method of claim 1, wherein the cleansing in real-time comprises performing the cleansing upon the receipt of the global positioning system data by the central system.

5. The method of claim 1, wherein the cleansing of the global positioning system data comprises executing an outlier detection technique for removing the at least one value in the global positioning system data.

6. The method of claim 1, wherein the cleansing of the global positioning system data comprises removing points in the global positioning system data that characterize that at least one of velocity and distance covered by the individual is more than respective threshold values to remove infeasible data from the global positioning system data.

7. The method of claim 1, wherein the cleansing of the global positioning system data comprises removing, from the global positioning system data, data for which values of corresponding accuracy metric are below a corresponding threshold value.

8. The method of claim 1,
wherein the trained predictive model predicts the categories based on the global positioning data variables for the individual.

9. The method of claim 8, wherein the basic activity variables comprise: total distance travelled by the individual, an hour when the individual performs maximum activity, average distance travelled per day by the individual, weekend activity of the individual, velocity of travel by the individual, and an idle time of the individual.

10. The method of claim 8, wherein the place of interest variables are computed using a text mining technique.

11. The method of claim 1, wherein the trained predictive model is trained in a design-time mode prior to the real-time.

12. The method of claim 11, wherein the training of the predictive model comprises:
obtaining, by the central system, global positioning system data for a plurality of individuals;
cleansing, by the central system, the global positioning system data of the plurality of individuals;
computing, by the central system, the global positioning system data variables for each individual of the plurality of individuals, the global positioning data variables for each individual of the plurality of individuals including: the basic activity variables characterizing activity of each individual, the anchor point variables characterizing locations where each individual spends most time within a day, the path variables that characterizes an averaged routine path followed by each individual, and the place of interest variables characterizing locations where each individual frequently purchases one or more products; and
obtaining, by the central system, historical transaction data for each individual of the plurality of individuals; and generating and training, by the central system, a predictive model based on the global positioning system data variables and the historical transaction data of each individual.

13. A mobile device comprising:
at least one programmable processor; and
a machine-readable medium storing instructions that, when executed by the at least one processor, cause the at least one programmable processor to perform operations comprising:
recording, for at least a threshold duration of time, global positioning system data of an individual, the global positioning system data comprising a time stamp characterizing a time of recording the global positioning system data, a place of interest where the individual frequently purchases one or more products and is likely to purchase some products in future, and a distance of the place of interest from a location of the individual;
sending the global positioning system data to a central system comprising one or more servers via a communication network,
merging, by the central system and in real-time, the received global positioning system data with historical global positioning system data of the individual to obtain a combined global positioning system data, the historical global positioning system data obtained from the mobile device of the individual;
obtaining, in response to the merging, historical transaction data of the individual, the historical transaction data collected from one or more financial institutions associated with individual;
cleansing, by the central system and in real-time, the global positioning system data to remove a high variability in frequency and spread of recorded location points in the global positioning system data, the cleansing comprising averaging the global positioning system data by using a sliding window approach, the averaging obviating an impact of motion vectors associated with global positioning data, the cleansing of the global positioning data further comprising removing at least one outlier value in the global positioning data that has a frequency below a threshold frequency value,
computing, by the central system and based on the combined global positioning system data and the historical transaction data, global positioning data variables for the individual, the global positioning data variables including: basic activity variables characterizing activity of the individual, anchor point variables characterizing locations where the individual spends most time within a day, path variables that characterizes an averaged routine path followed by the individual, and place of interest variables characterizing locations where the individual frequently purchases one or more products;
executing, by the central system, a trained predictive model that predicts categories of at least one of products and services preferred by the individual, the trained predictive model using the global positioning data of the individual, the historical transaction data of the individual, and the global positioning data variables to generate relevant offers from relevant merchants located within a threshold distance from the location of the individual, the relevant merchants selling at least one of products and services that are associated with the predicted categories and that the individual is likely to purchase;
receiving the generated offers from the central system; and displaying the generated offers on a graphical user interface in real-time.

14. The mobile device of claim 13, wherein:
the global positioning system data comprises one or more of: an identifier used to uniquely identify the individual, the location comprising a latitude and a longitude of the individual, a time stamp characterizing the time of recording the global positioning system data, an accuracy of the recorded global positioning system data, a place of interest where the individual frequently visits and/or purchases one or more products and is likely to visit and/or purchase some products in future, and distance of the place of interest from the location of the individual; and
the trained predictive model is one of a scorecard model, a discrete choice model, a discriminant analysis model, a log-linear model, a neural network, a pattern recognition model, a regression model, a support vector machine, a survival analysis and tree model.

15. The mobile device of claim 13, wherein the central system computes the global positioning data variables for the individual, the global positioning data variables including: basic activity variables characterizing activity of the individual, the anchor point variables characterizing locations where the individual spends most time within a day, the path variables that characterizes an averaged routine path followed by the individual, and the place of interest variables characterizing locations where the individual frequently visits and/or purchases one or more products.

16. The mobile device of claim 13, wherein:
the trained predictive model is trained earlier in a design-time mode; and
the training of the predictive model comprises:
obtaining, by the central system, global positioning system data for a plurality of individuals;
performing, by the central system, the cleansing of the global positioning system data of the plurality of individuals;
computing, by the central system, the global positioning data variables for each individual of the plurality of individuals; and
obtaining, by the central system, historical transaction data for each individual of the plurality of individuals; and
generating and training, by the central system, a predictive model based on the global positioning data variables and the historical transaction data of each individual.

17. A non-transitory computer program product storing instructions that, when executed by at least one programmable processor, cause the at least one programmable processor to perform operations comprising:
obtaining, by a central system comprising one or more servers, global positioning system data for a plurality of individuals, the global positioning system data comprising a time stamp characterizing a time of recording the global positioning system data, a place of interest where the individuals frequently purchases one or more products and are likely to purchase some products in future, and a distance of the place of interest from a location of the individuals;
merging, by the central system and in real-time, the obtained global positioning system data with historical global positioning system data of an individual of the plurality of individuals to obtain a combined global positioning system data, the historical global positioning system data obtained from a mobile device of the individual;
obtaining, in response to the merging, historical transaction data of the individual, the historical transaction data collected from one or more financial institutions associated with individual;
computing, by the central system and based on the combined global positioning system data and the historical transaction data, global positioning data variables for the individual, the global positioning data variables including: basic activity variables characterizing activity of the individual, anchor point variables characterizing locations where the individual spends most time within a day, path variables that characterizes an averaged routine path followed by the individual, and place of interest variables characterizing locations where the individual frequently purchases one or more products;
cleansing, by the central system, the global positioning system data of the plurality of individuals, the cleansing comprising averaging the global positioning system data by using a sliding window approach, the averaging obviating an impact of motion vectors associated with global positioning system data, the cleansing of the global positioning system data further comprising removing at least one outlier value in the global positioning system data that has a frequency below a threshold frequency value; and
generating and training, by the central system, a predictive model based on the global positioning system data variables, the global positioning data variables, and the historical transaction data of the individual, the trained predictive model being a scorecard model, the trained predictive model being used in a run-time mode for generating real-time offers for an individual by relevant merchants that are located within a threshold distance from the location of the individual.

18. The computer program product of claim 17, wherein the run-time mode for generating real-time offers comprises:
receiving, at the central system connected to the mobile device of the individual via a communication network, global positioning system data of the individual recorded by the mobile device;
predicting, by the central system by using the trained predictive model and based on the historical transaction data of the individual and the global positioning system data of the individual, categories of products likely to be purchased by the individual; and
generating, by the central system, offers from the relevant merchants of the predicted categories that are located within the threshold distance from the location of the individual, the generated offers being sent by the central system to the mobile device that displays the generated offers in real-time.

19. The method of claim 1, wherein the high variability characterizes variability that is more than a threshold variability.

20. The method of claim 1, wherein the historical transaction data collected from the mobile device.

* * * * *